(12) United States Patent
Taylor et al.

(10) Patent No.: US 10,055,166 B1
(45) Date of Patent: Aug. 21, 2018

(54) METHOD, DATA STORAGE SYSTEM AND COMPUTER PROGRAM PRODUCT FOR MANAGING DATA COPYING

(71) Applicant: EMC Corporation, Hopkinton, MA (US)

(72) Inventors: Alan L. Taylor, Cary, NC (US); David Haase, Fuquary Varina, NC (US); Michael C. Brundage, Cary, NC (US); Somnath A. Gulve, Pune (IN); Varun K. Chinta, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 52 days.

(21) Appl. No.: 15/199,583

(22) Filed: Jun. 30, 2016

(51) Int. Cl.
  *G06F 12/00* (2006.01)
  *G06F 3/06* (2006.01)

(52) U.S. Cl.
  CPC .............. *G06F 3/065* (2013.01); *G06F 3/061* (2013.01); *G06F 3/0673* (2013.01)

(58) Field of Classification Search
  CPC ......... G06F 3/061; G06F 3/065; G06F 3/0673
  See application file for complete search history.

(56) References Cited

U.S. PATENT DOCUMENTS

| | | | | |
|---|---|---|---|---|
| 4,747,100 A | * | 5/1988 | Roach | H04L 12/417 370/452 |
| 6,834,332 B2 | * | 12/2004 | Craddock | G06F 12/12 709/229 |
| 8,327,103 B1 | * | 12/2012 | Can | G06F 3/061 710/39 |
| 2004/0044864 A1 | * | 3/2004 | Cavallo | G06F 3/0617 711/162 |
| 2005/0278492 A1 | * | 12/2005 | Stakutis | G06F 11/2082 711/161 |
| 2006/0106878 A1 | * | 5/2006 | Shitomi | G06F 17/30067 |

* cited by examiner

*Primary Examiner* — Tuan Thai
*Assistant Examiner* — Tasnima Matin
(74) *Attorney, Agent, or Firm* — Krishnendu Gupta; Jason A. Reyes

(57) ABSTRACT

There are disclosed techniques for use in managing data copying. In one embodiment, there is disclosed a method including a number of steps. The method comprises performing a first operation to copy data from a first region of a source area. The method also comprises determining a count relating to pending I/O requests in connection with a second region of the source area upon completion of the first operation. And, in response to determining that the count relating to pending I/O requests in connection with the second region of the source area equals zero, the method further comprises performing a second operation to copy data from the second region of the source area and configuring a new region in the source area to record a count relating to pending I/O requests in connection with the source area.

6 Claims, 3 Drawing Sheets

METHOD, DATA STORAGE SYSTEM AND COMPUTER PROGRAM PRODUCT FOR MANAGING DATA COPYING

TECHNICAL FIELD

The present invention relates to a method, a data storage system and a computer program product for managing data copying.

BACKGROUND OF THE INVENTION

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

A common function of data storage systems is to copy data from a source to a destination. The purpose of such copying may be to create a clone of a data object or to migrate a data object. For example, data storage systems may migrate data objects, such as file systems, LUNs (Logical Unit Numbers, referring also to the units themselves) and VVols. Migration may be performed for numerous reasons, such as to provide a higher service level, e.g., by hosting data objects from faster disk drives. After migration, hosts can access the data object from the destination.

Unfortunately, the conventional approaches to copying data from a source to a destination encounter some problems. For example, at least some of these approaches maintain a list of in-progress host initiated I/O requests, and a host initiated I/O write request has to check to see if a copy I/O is in-progress to the same region. If there is a copy I/O in-progress, the host initiated I/O write request signals that the copy I/O should restart the transfer. The retransfer is important since the copy I/O can make no guarantees about the state of the source data (e.g., was the old or new data copied). Additionally, copy I/O's need to verify that no such I/O request is in-progress prior to starting the copy I/O by checking the list of in-progress host initiated I/O requests. However, maintaining a list of requests as described above does not scale well and hinders performance. This is undesirable.

SUMMARY OF THE INVENTION

There is disclosed a method, comprising: performing a first operation to copy data from a first region of a source area; upon completion of the first operation, determining a count relating to pending I/O requests in connection with a second region of the source area; and in response to determining that the count relating to pending I/O requests in connection with the second region of the source area equals zero, performing a second operation to copy data from the second region of the source area and configuring a new region in the source area to record a count relating to pending I/O requests in connection with the source area.

There is also disclosed a data storage system, comprising: a control circuitry that includes a set of processing units coupled to memory, the control circuitry constructed and arranged to: perform a first operation to copy data from a first region of a source area; upon completion of the first operation, determine a count relating to pending I/O requests in connection with a second region of the source area; and in response to determining that the count relating to pending I/O requests in connection with the second region of the source area equals zero, perform a second operation to copy data from the second region of the source area and configure a new region in the source area to record a count relating to pending I/O requests in connection with the source area.

There is further disclosed a computer program product including a set of non-transitory, computer-readable media having instructions which, when executed by control circuitry of a data storage system, cause the control circuitry to perform a method, the method comprising: performing a first operation to copy data from a first region of a source area; upon completion of the first operation, determining a count relating to pending I/O requests in connection with a second region of the source area; and in response to determining that the count relating to pending I/O requests in connection with the second region of the source area equals zero, performing a second operation to copy data from the second region of the source area and configuring a new region in the source area to record a count relating to pending I/O requests in connection with the source area.

BRIEF DESCRIPTION OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

Figure 1:
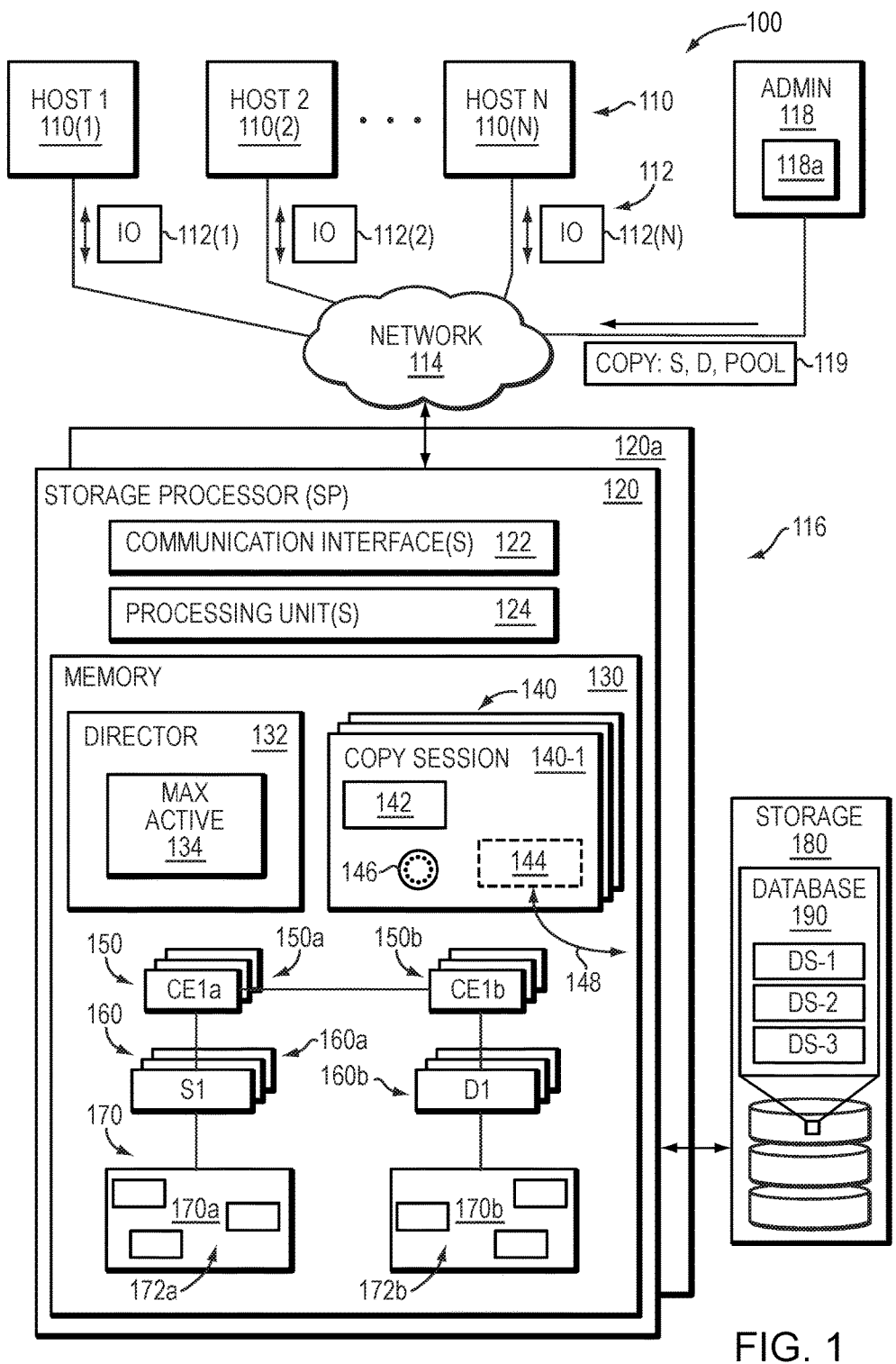
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110(1) through 110(N) and an administrative machine 118 access a data storage system 116 over a network 114. The data storage system 116 includes a storage processor, or "SP," 120 and storage 180, such as magnetic disk drives, electronic flash drives, and the like. The storage 180 is configured to store both host data and a database 190. In an example, database 190 persistently stores information related to the operation and management of the data storage system 116.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It should be understood, however, that no particular hardware configuration is required, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. Hosts 110 may connect to the SP 120 using various technologies, such as Fibre Channel, iSCSI, NFS, SMB 3.0, and CIFS, for example. Any number of hosts 110 may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112 (e.g. 112(1-N)) according to block-based and/or file-based protocols and to respond to such IO requests 112 by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs, as well as associated chipsets and coprocessors. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," e.g., realizes by execution of software instructions, a director 132, copy sessions 140, copy engines 150, data objects 160, and storage pools 170. The storage pools 170 include storage extents created from disk drives in the storage 180. For example, pool 170a includes extents 172a, which may be derived from magnetic disk drives in storage 180. Similarly, pool 170b includes extents 172b, which may be derived from solid state drives in the storage 180. The data storage system 116 is configured to build data objects 160 upon respective pools. For example, the data storage system 116 builds data objects 160a upon pool 170a and composes the data objects 160a from storage extents 172a. As a result of operating copy sessions 140, the data storage system 116 creates data objects 160b as copies of data objects 160a, with data objects 160b built upon pool 170b and composed from storage extents 172b.

In example operation, the hosts 110 issue IO requests 112 to the data storage system 116. The SP 120 receives the IO requests 112 at the communication interfaces 122 and initiates further processing. Such processing may include executing instructions for reading and writing the data objects 160a.

Asynchronously with the receipt of IO requests 112 from hosts 110, an administrator of administrative machine 118 operates a program 118a to initiate one or more copy sessions 140. For example, the program 118a sends a copy request 119 that identifies (i) a source object to be copied, (ii) a destination object to be created, and (iii) a destination pool on which the destination object is to be created. For simplicity, it is assumed in this example that the copy sessions 140 specify data objects 160a as sources, specify data objects 160b as destinations, and specify pool 170b as the destination pool in each case. However, copy sessions may specify sources and destinations in either pool 170. In some examples, the source and destination objects may reside in the same pool 170. Also, the data storage system 116 may include any number of pools 170. In the manner described, the administrator may specify any number of copy sessions, such as hundreds or even thousands. Although this example involves a human administrator that specifies copy sessions 140, such sessions may alternatively be initiated by a software program or other construct without direct human involvement.

In the particular example shown in FIG. 1, the data storage system 116 may receive a request 119 to create a new copy session. The request specifies source S1, destination D1, and pool 170b. In response to the request 119, the SP 120 creates a new session 140-1 in memory 130, e.g., as an executable object, procedure, thread, or set of threads. SP 120 generates a new copy-session ID (SID) for session 140-1 (i.e., a unique identifier of copy session 140-1 in the data storage system 116). SP 120 also allocates volatile memory space 142 in session 140-1 for storing core properties of the copy session 140-1. For example, the copy session 140-1 declares variables, instantiates objects, or otherwise obtains memory space 142. The core properties stored in memory space 142 include, for example, the identity of the source (S1), the identity of the destination (D1), and a state of the copy session 140-1, i.e., whether the copy session 140-1 is active or inactive.

In an example, the SP 120 creates a container for the destination object D1 in pool 170b and inserts copy engines CE1a and CE1b into the IO paths of objects S1 and D1. These copy engines CE1a and CE1b are configured to perform fast copying from S1 to D1 and to provide copy progress information for session 140-1. SP 120 allocates volatile memory portion 144 in copy-session 140-1 for storing such copy-progress information, e.g., in declared variables, classes, etc. Copy-progress information may include, for example, counters, progress indicators, bitmaps, and the like, which reflect a detailed current status of data copying activities from S1 to D1.

To provide swap space and to enable recovery in cases of data corruption, power failures, and the like, SP 120 may persist session information in database 190. The database 190 may include data structures DS-1, DS-2, and DS-3. In an example, SP 120 persists the SID of session 140-1 in DS-1, e.g., along with SIDs of other running copy sessions 140. SP 120 also persists core properties of session 140-1 in DS-2, e.g., along with core properties of other running copy sessions 140. SP 120 further persists copy-progress data in DS-3, e.g., along with copy-progress data of other sessions 140. It should thus be appreciated that data structure DS-2 persists core properties held in volatile memory space 142 and that data structure DS-3 persists copy-progress data held in volatile memory portion 144.

With the copy session 140-1 running, the copy engines CE1a and CE1b may begin copying the data of S1 to D1. As copying proceeds, the copy engines CE1a and CE1b update the copy-progress information in memory portion 144. To keep data stored persistently in DS-3 approximately current with data accumulating in memory portion 144, copy session 140-1 flushes the copy-progress information from memory portion 144 to DS-3. Such flushing 148 may be performed in accordance with a schedule 146, which may be time-based (e.g., every 5 minutes, every hour, etc.), based on how much copy progress has changed since the last flushing 148 or since the start of copying (e.g., based on the amount of data copied), or based on a combination of these factors.

The data storage system 116 may run many copy sessions 140 at a time, and the demands on memory 130 may become great. If left unregulated, copy sessions 140 can consume so much memory 130 as to impair real-time functions of the data storage system 116, such as its ability to service IO requests 112 at guaranteed speeds. To avoid this undesirable outcome, director 132 selectively places some of the copy sessions 140 in an inactive state and frees some of their consumed memory, making such memory available for more critical real-time activities.

For example, director 132 instructs copy session 140-1 to assume the inactive state. In response, copy session 140-1 directs copy engines CE1a and CE1b to stop active copying. Copy session 140-1 updates persistent storage in DS-2 to reflect the change in its core properties from active to inactive. It further flushes copy-progress data to DS-3. Once copy-progress data has been persisted, the copy session 140-1 frees memory portion 144. For example, session 140-1 may destroy any software objects storing copy-progress data, set pointers to null, and so forth. As memory portion 144 may have occupied a large memory footprint, freeing memory portion 144 significantly reduces the total memory footprint of copy session 140-1. When placed in the inactive state, copy session 140-1 continues to run, albeit in a state of reduced functionality. For example, copy session 140-1 may continue to respond to polling, e.g., informational requests from the administrative program 118a, but it cannot perform active copying.

At some later point, director 132 may instruct copy session 140-1 to resume the active state. In response, copy session 140-1 recreates software objects (e.g., variables, classes, etc.), retrieves previously-persisted copy-progress data from DS-3, and populates the newly recreated software objects with the retrieved data. Although the memory used by the new objects is not necessarily the identical memory cells that formed memory portion 144, the new objects consume approximately the same amount of space as that described in connection with memory portion 144. The session 140-1 may then pick up copying where it left off, with copy engines CE1a and CE1b performing physical copying and keeping copy-progress data current.

In an example, the director 132 selectively instructs copy sessions 140 to become active and inactive over time so as to keep the number of active sessions within a predetermined limit 134. For example, the director 132 may arrange sessions 140 in groups and allow only a single group to be active at a time, while the rest are inactive. The number of sessions in each group may be set to the limit 134. The director 132 may cycle through the groups, giving each group time to run in the active state, before advancing to the next group. In this manner, the data storage system 116 regulates the amount of memory 130 consumed by copy sessions 140 and ensures that the copy sessions 140 do not impair real-time operations. Such regulation is achieved, however, without completely disabling inactive copy sessions, as they continue to run and are able to respond to polling from administrative program 118a.

Furthermore, as mentioned above, when the copy session 140-1 is running, the copy engines CE1a and CE1b may begin copying the data from source S1 to destination D1. In at least one embodiment, the copy engines CE1a and CE1b may copy data from respective regions of source S1 moving sequentially through all the regions until all the data is copied to destination D1. For example, the source S1 may include regions that are classified as X, Y and Z depending on the progress of the copy session 140-1. Here, the X classification represents a region that has already been copied, the Y classification represents a region that is currently being copied or preparing to be copied, and the Z classification represents a region that is not yet copied nor preparing to be copied. In this particular example, the copy session 140-1 starts by copying a region from the source S1 to destination D1. Once complete, the region is classified as an X region. The copy session 140-1 then moves onto next region which has been preparing to be copied and is classified as a Y region. The copy session 140-1 proceeds to perform a second copy operation to copy data in connection with this region. While this second copy operation is in progress, another region is classified as a Y region and is preparing to be copied. The remainder of the source S1 is classified as Z region. If the second copy operation is successful, the Y region associated with this operation transitions to an X region. The copy session 140-1 moves onto the next region which has been preparing to be copied and is classified as a Y region to perform a third copy operation. At the same time, a portion of the Z region transitions to a Y region in order to prepare it for copying. This process continues until all the data is copied to the destination D1. This will be described in further detail below.

As will be appreciated, one of the difficulties with the copy session 140-1 is that IO requests 112 may be received when the copy engines CE1a and CE1b are copying the data from source S1 to destination D1. In such a case, how the system responds will depend on where in the source S1 the IO requests 112 are directed (i.e., what region of the source S1) and whether the IO requests 112 are read or write requests. If the IO requests 112 are write requests received in the X region then data associated with requests must be mirrored from source S1 to destination D1. With respect to the Y region, if the I/O requests 112 are write requests that collide with the copy I/O then this will cause a retransfer of the copy I/O because there is no way to guarantee consistency of the copy to the destination D1. In such a case, it is flagged in the metadata that the copy request needs a retry once the write I/O completes. Any IO requests 112 that are write requests received in the Z region are allowed to write to the source S1 with no implications to the destination D1 or to the copy I/O. Requests 112 that are read requests received in any of the aforementioned regions can be satisfied from those particular regions. Read requests in region X may also be satisfied from the destination D1.

Additionally, in at least one embodiment, the copy session 140-1 maintains an array of counters that tracks I/O (i.e., write I/O) to one or more respective regions. Each counter is configured to be either incremented or decremented depending on whether the write I/O is received or completed. For example, the counter is incremented when write I/O is received and decremented when write I/O is completed. It should be understood that when a copy operation completes in the Y region the copy engine waits for the count of write IO requests 112 (i.e., write requests) in the next region to reach zero indicating that it is safe to advance to the next region (also classified as Y as it is preparing to be copied) and continue copying. When this happens, the X region grows to include the old Y, and the Z region shrinks to represent the fact that there is less to copy.

As will be appreciated, if there is a large busy LUN/FS/VVol it can take a long time for the Z region to be quiescent. For this region, there exists a number of Y' regions that are Y regions preparing to be copied by tracking IO write requests 112 in advance of the copy actually beginning. These regions will track IO write requests 112, but act like a small sub-Z region. These smaller Y' regions provide a finer granularity tracking so that the copy I/O can advance without waiting for the entire Z region to become quiescent. When a copy competes and the Y region advances the Z region carves up a new Y' region so that it can be prepared to be copied.

Figure 2A:
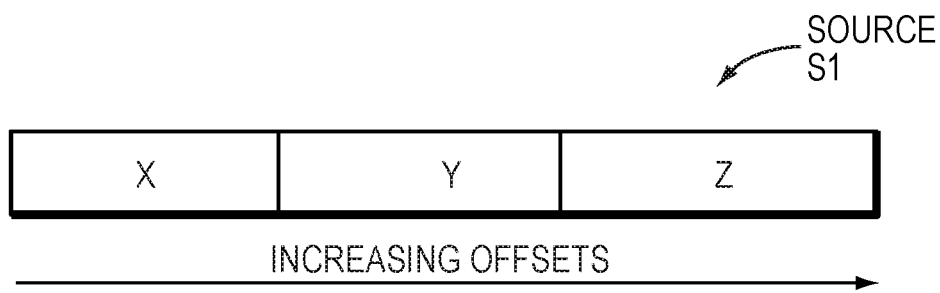
FIGS. 2A, 2B and 2C are diagrams showing examples of the source S1 of FIG. 1 in further detail in an embodiment in accordance with techniques herein.

FIG. 2A shows an example of the source S1 of FIG. 1 in further detail. As will be seen, the source S1 may be a contiguous space ranging from offset 0 to offset N and divided into X, Y and Z regions representing respective copy states. As discussed earlier, the X region represents a region that has already been copied, the Y region represents a region that is currently being copied or preparing to be copied, and the Z region represents a region that has not yet been copied. The copy operations performed by the copy engines CE1a and CE1b during the copy session 140-1 move through the regions sequentially as will be described further below.

Figure 2B:
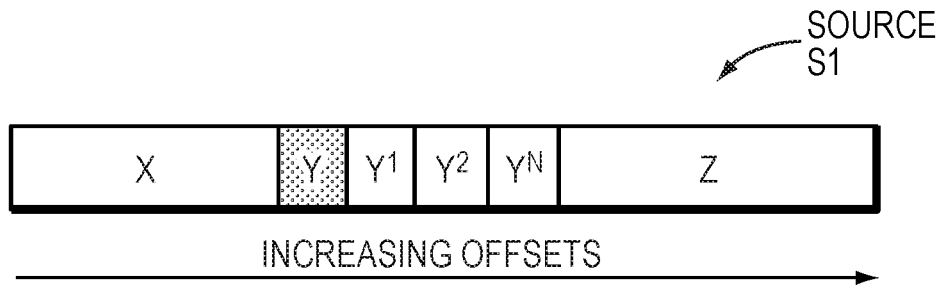

FIG. 2B shows an example of the source S1 of FIG. 1 in further detail. In this particular embodiment, the Y region is further divided into a plurality of regions, namely, Y, $Y^1$, $Y^2$ and $Y^N$. The Y region represents the region currently copying. The $Y^1$, $Y^2$ and $Y^N$ represent those regions that are preparing for copying. Each of these Y regions is sized to the backend copy I/O (i.e., 4 MB). As will be appreciated from the foregoing, the $Y^1$, $Y^2$ and $Y^N$ regions in this embodiment represent regions that are "on-deck" or getting ready to be copied. Each of these "on-deck" regions comprises write I/O counts representing the current number of outstanding write I/O to that area. As a copy completes, the Y region is advanced to $Y^1$ and the X region moves to the old Y region subject to the count in $Y^1$ equaling zero. In addition, the copy session 140-1 advances into Z and carve off a new $Y^N$ region as will be described below.

Figure 2C:
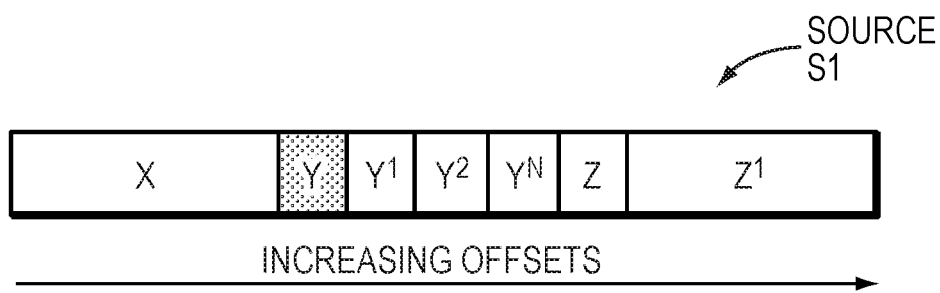

FIG. 2C shows an example of the source S1 of FIG. 1 in further detail. In this particular embodiment, the Z region is further divided into regions, namely, Z and $Z^1$. It should be understood that the Z region in this figure will be the new $Y^N$ region referred to in the previous paragraph. Therefore, once the copy completes at the Y region, and subject to the count in $Y^1$ equaling zero, the old Z region is split into Z (i.e., the new $Y^N$ region) and $Z^1$. Also, it should be appreciated that the old Z region before it is divided into Z (i.e., new $Y^N$ region) and $Z^1$ could represent a large region and the associated I/O write count could be large. As a result, a generation number that is associated with each I/O request in this old region is maintained, and these I/O request become associated with the new $Y^N$ region. Further, a new generation number is generated for $Z^1$ and become associated with any new I/O requests in this region. The generation numbers are employed for Z tracking in order to distinguish between Z (i.e., the new $Y^N$ region) and $Z^1$. If an I/O request completes the generation number is compared with the Z regions to determine where it needs to be tracked (i.e., counts incremented or decremented).

Figure 3:
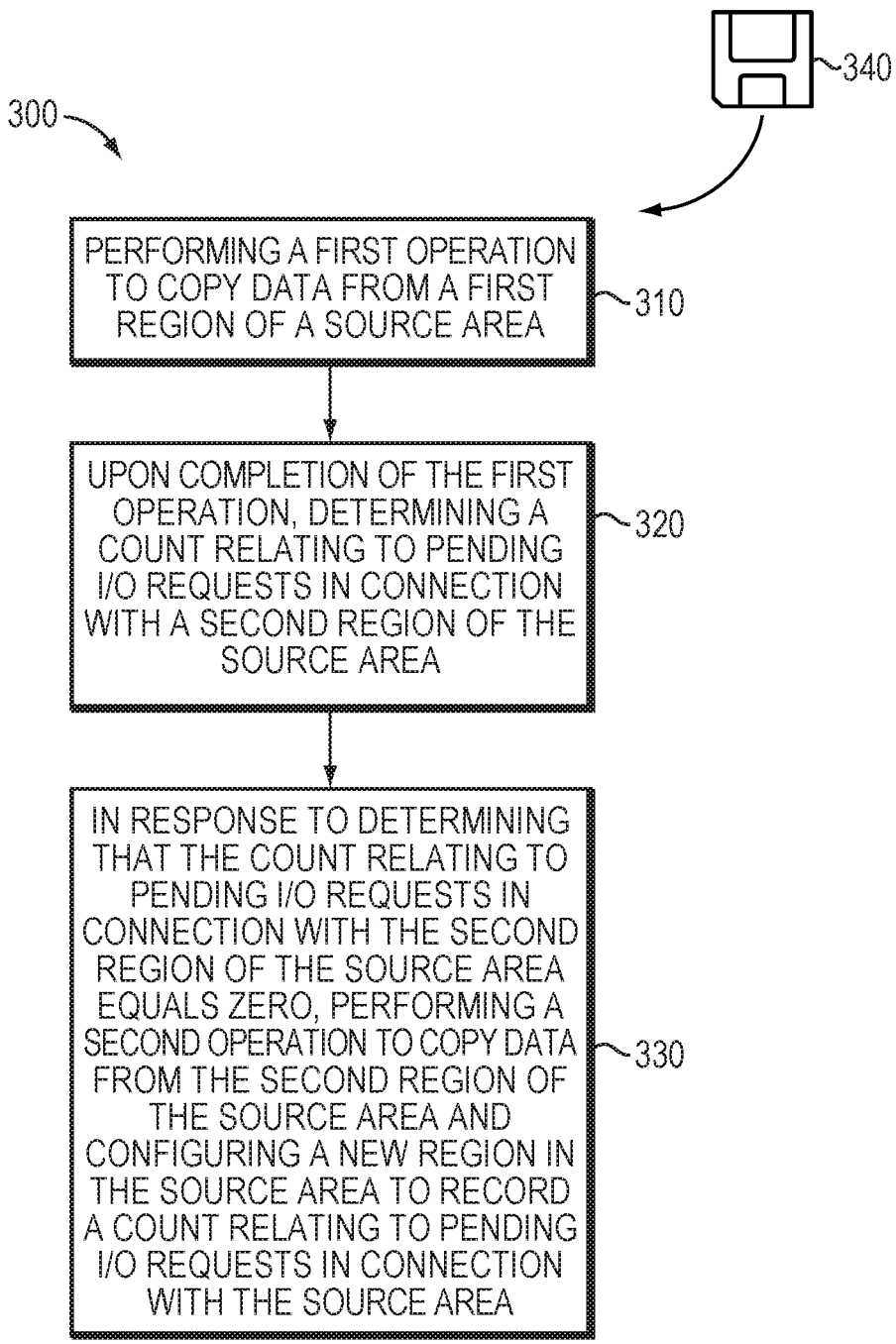
FIG. 3 is a flowchart showing an example method of managing the copying of data in an embodiment in accordance with techniques herein.

FIG. 3 shows an example method 300 that may be carried out in connection with the data storage system 116. The method 300 may be performed, for example, by the software constructs described in connection with FIG. 1, which reside in the memory 130 of SP 120 and are run by the set of processing units 124. The various acts of the method 300 may be ordered in any suitable way. For example, embodiments may be constructed in which acts are performed in different orders from that illustrated, which may include performing some acts simultaneously.

At step 310, a first operation is performed to copy data from a first region of a source area (e.g., source S1). At step 320, upon completion of the first operation, a count is determined relating to pending I/O requests in connection with a second region of the source area. At step 330, in response to determining that the count relating to pending I/O requests in connection with the second region of the source area equals zero, a second operation is performed to copy data from the second region of the source area and a new region is configured in the source area to record a count relating to pending I/O requests in connection with the source area.

It should be appreciated from the discussions with respect to previous figures that operations to copy data are performed sequentially in connection with respective regions of the source area until all the data is copied from the source area. For example, as illustrated in FIG. 2, one or more regions including the new region within the source area are configured to record counts of pending I/O requests in their respective regions in advance of discrete operations to copy data therefrom. One of these discrete operations will be performed in connection with one region of the one or more regions when the second operation completes the copying of data from the second region and the count in connection with the one region equals zero Also, it should be noted that at step 330, the step includes copying data from the second region of the source area and confirming completion of the second operation. The step also comprises recording a count, associated with the new region, relating to pending I/O requests in connection with the source area. The count corresponding to the number of pending I/O requests in connection with the uncopied region of which the new region forms at least part of the uncopied region.

Having described certain embodiments, numerous alternative embodiments or variations can be made. For example, although embodiments have been described in which certain acts are performed by SP 120, such acts may alternatively be performed by SP 120a, or by both SP 120 and SP 120a working together.

Further, although the copying described herein is conducted between a source in the data storage system 116 and a destination in the data storage system 116, some embodiments do not require both the source and the destination to be in the same data storage system. Also, some or all of the storage 180 may be located remotely from SP 120, e.g., in a different room, building, or even online or in the cloud. Such remote storage is still considered to be part of the data storage system 116, provided that the SP 120 can access the storage devices backing both the source and the destination.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 340 in FIG. 3). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method, comprising:
   receiving a request to copy data from a source area to a target area;
   in response to receiving the request, initiating a copy of data from a first portion of the source area to the target area;
   while copying data from the first portion to the target area, monitoring I/O requests in connection with the source area;
   detecting completion of the copy of data from the first portion to the target area;
   upon detecting completion of the copy, and based on the said monitoring of I/O requests, determining an amount of pending I/O requests associated with a second portion of the source area; and
   in response to determining that there is no pending I/O requests associated with the second portion, processing the request to copy data from the source area to the target area, comprising:
      initiating a copy of data from the second portion to the target area;
      carving a third portion from an uncopied portion of the source area;
      identifying pending I/O requests associated with the uncopied portion; and
      assigning the identified pending I/O requests to the third portion such that a decision to proceed with copying of data from the third portion to the target area will be dependent on whether the said identified pending I/O requests have been processed.

2. The method as claimed in claim 1, wherein operations to copy data are performed sequentially in connection with respective regions of the source area until all the data is copied from the source area.

3. A data storage system, comprising:
   a control circuitry that includes a set of processing units coupled to memory, the control circuitry constructed and arranged to:
      receive a request to copy data from a source area to a target area;
      in response to receiving the request, initiate a copy of data from a first portion of the source area to the target area;
      while copying data from the first portion to the target area, monitor I/O requests in connection with the source area;
      detect completion of the copy of data from the first portion to the target area;
      upon detecting completion of the copy, and based on the said monitoring of I/O requests, determine an amount of pending I/O requests associated with a second portion of the source area; and
      in response to determining that there is no pending I/O requests associated with the second portion, process the request to copy data from the source area to the target area, comprising:
         initiating a copy of data from the second portion to the target area;
         carving a third portion from an uncopied portion of the source area;
         identifying pending I/O requests associated with the uncopied portion; and
         assigning the identified pending I/O requests to the third portion such that a decision to proceed with copying of data from the third portion to the target area will be dependent on whether the said identified pending I/O requests have been processed.

4. The data storage system as claimed in claim 3, wherein operations to copy data are performed sequentially in connection with respective regions of the source area until all the data is copied from the source area.

5. A computer program product including a set of non-transitory, computer-readable media having instructions which, when executed by control circuitry of a data storage system, cause the control circuitry to perform a method, the method comprising:
   receiving a request to copy data from a source area to a target area;
   in response to receiving the request, initiating a copy of data from a first portion of the source area to the target area;
   while copying data from the first portion to the target area, monitoring I/O requests in connection with the source area;
   detecting completion of the copy of data from the first portion to the target area;

upon detecting completion of the copy, and based on the said monitoring of I/O requests, determining an amount of pending I/O requests associated with a second portion of the source area; and in response to determining that there is no pending I/O requests associated with the second portion, processing the request to copy data from the source area to the target area, comprising:

initiating a copy of data from the second portion to the target area;

carving a third portion from an uncopied portion of the source area;

identifying pending I/O requests associated with the uncopied portion; and assigning the identified pending I/O requests to the third portion such that a decision to proceed with copying of data from the third portion to the target area will be dependent on whether the said identified pending I/O requests have been processed.

6. The computer program product as claimed in claim 5, wherein operations to copy data are performed sequentially in connection with respective regions of the source area until all the data is copied from the source area.

\* \* \* \* \*